United States Patent [19]

Wildenrotter

[11] 4,239,344
[45] Dec. 16, 1980

[54] REFLECTOR FOR SOLAR COLLECTORS

[75] Inventor: Karl Wildenrotter, Munich, Fed. Rep. of Germany

[73] Assignee: Maschinenfabrik Augsburg-Nürnberg Aktiengesellschaft, Munich, Fed. Rep. of Germany

[21] Appl. No.: 930,643

[22] Filed: Aug. 3, 1978

[30] Foreign Application Priority Data

Aug. 26, 1977 [DE] Fed. Rep. of Germany ....... 2738595

[51] Int. Cl.³ ............................................... G02B 5/08
[52] U.S. Cl. .................................... 350/310; 350/296; 350/320
[58] Field of Search .............. 350/288, 293, 296, 310, 350/320

[56] References Cited

U.S. PATENT DOCUMENTS

| 3,906,927 | 9/1975 | Caplan | 350/310 X |
| 4,009,947 | 3/1977 | Nishida et al. | 350/288 |
| 4,035,065 | 7/1977 | Fletcher et al. | 350/310 |

Primary Examiner—F. L. Evans
Attorney, Agent, or Firm—Scully, Scott, Murphy & Presser

[57] ABSTRACT

A reflector for solar collectors including a mirror-coated glass plate of which the plate thickness lies below the thickness required for a self-supporting glass plate, and in which the glass plate has the mirror-coated side thereof bonded to a support member, thus providing a high-quality, lightweight structure.

1 Claim, 4 Drawing Figures

REFLECTOR FOR SOLAR COLLECTORS

BACKGROUND OF THE INVENTION

1. Field of the Invention

The present invention relates to a reflector for solar collectors including a glass plate which is mirror-coated on one side thereof.

The quality of a reflector of that type depends upon the mirror-coating, the surface geometry, as well as the light-transmissive layer, namely the glass thickness. The surface geometry has particularly a great influence for concave reflectors, which serve for the collimation of the rays incident thereon.

2. Discussion of the Prior Art

For the protection of the reflection surface and for the production of a satisfactorily smooth surface, the mirror-coating is, in a usual manner, located on the rear surface of the glass plate. Occasioned thereby are energy losses caused by absorption, since the rays must twice traverse the glass plate.

SUMMARY OF THE INVENTION

Accordingly, the present invention has as its object the provision of a novel and improved reflector of the above-mentioned type, wherein the energy losses are reduced in contrast with the usual reflectors.

The foregoing object is inventively achieved in that there is provided a mirror-coated glass plate of which the plate thickness lies below the thickness required for a self-supporting glass plate, and in which the glass plate has the mirror-coated side thereof bonded to a support member.

In the instance there is obtained a self-supporting reflector which evidences only a thin glass layer through which there must pass the incident and reflected rays. As a result, there is reduced the energy absorption through the glass plate. Particularly for curved reflectors the inventive construction affords the further advantage that the shaping of the reflector can be manufactured through a much easier and more precise mode. Cylindrical shapes can be easily provided through cold-forming so that, through the intermediary of a carefully machined support surface of the support member, there can be produced a reflector having a high degree of precision in its surface geometry.

In order to avoid any damages being imparted to the mirror-coating during the mounting of the glass plate on the support member, in accordance with a further embodiment of the invention there is provided a foil which is bonded between the glass plate and the support member. This intermediate foil provides the additional advantage that, on the one side, there can be utilized an adhesive material which is suitable for the mirror-coating and, on the other side, another adhesive material can be employed which is adapted for effecting the connection with the support member.

As a rule, collectors are assembled in large numbers into a collector installation. For this purpose, the collectors are connected to a support frame in proximity to each other and interconnected with each other. In the case of parabolic solar collectors, the reflectors and the therewith associated absorbers are connected with the support frame as separate components. For those types of cases, the invention contemplates that fastening elements be provided on the reflectors, said fastening elements being arranged on the support member at a distance from the glass plate. Achieved hereby is a practically undistorted suspension of the reflector, in which the strains and stresses of the connecting or joint locations are not conducted to the reflector but are absorbed by the support member. In order to be able to reinforce this effect, there can be provided straps which are formed out of the support member, or elastic elements attached to the support member such as, for example, rubber blocks, for connecting or mounting the fastening means.

It is advantageous when the support member is essentially constructed of a support plate and stiffening ribs or a honeycomb-like stiffener fastened thereto. This will render it possible to provide reflector constructions which in addition thereto may, for example, be constructed of thin aluminum sheets, so as to impart a minimum weight to the reflector. The support member can also be constituted of a plastic material or foamed structure.

BRIEF DESCRIPTION OF THE DRAWINGS

Reference may now be had to the following detailed description of preferred embodiments of reflectors for solar collectors pursuant to the invention, taken in conjunction with the accompanying drawings; in which.

DETAILED DESCRIPTION

Figure 1:
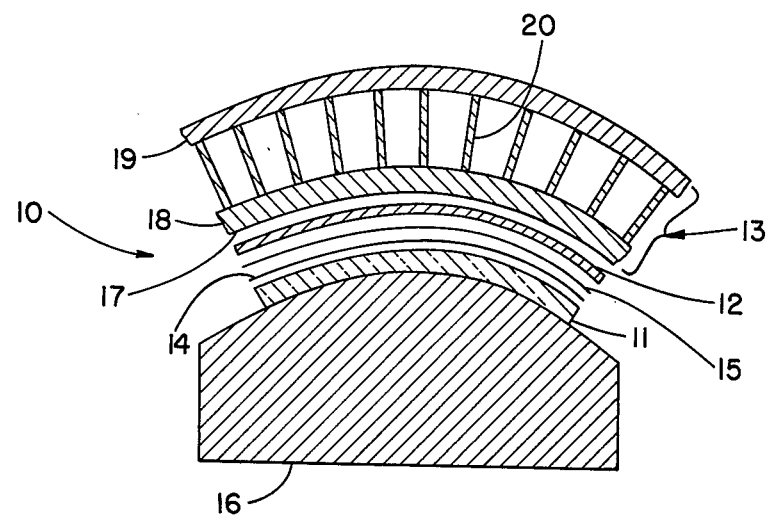
FIG. 1 illustrates an exploded sectional view of a parabolic reflector in accordance with the invention.

Illustrated in FIG. 1 of the drawings is a parabolic reflector 10 in an exploded sectional view. The reflector consists of a glass plate 11, a foil 12 and a support member 13. The glass plate 11 is provided on one side thereof with a mirror-coating 14 which, in turn, is covered with a covering lacquer 15 for the protection of the mirror-coating.

The thin mirror 11, 14, 15 is bent over a shaped form 16. Thereafter, the foil 12 is bonded to the mirrored side. Through the suitable selection of the foil thickness there can be set an optimum ratio between the tensile and torsional stresses which occur during bending. The foil can be constituted of metal and/or glass fibers. Subsequently, the support member 13 with the prefabricated curved support surface 17 is bonded on the foil 12. However, it is also possible to omit the foil 12 based upon a suitable raw material selection.

The support member 13 consists of a support or bed plate 18 which is retained in its shape and reinforced by means of a honeycomb-like or rib-like stiffener 20 and a base plate 19. The stiffener 20 can also be constructed of ribs, or a zigzag-curved surface or plate.

Through suitable material selection and dimensioning it is possible to assure that the reflector 10 has a light-weight and flat construction while nevertheless possessing the necessary rigidity and resistance, of which the glass mirror alone is not capable.

Figure 2:
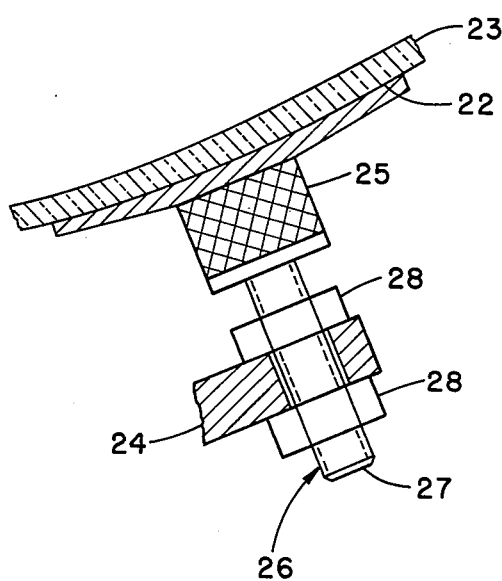
FIG. 2 illustrates a reflector with an associated support member.

Illustrated in FIG. 2 is a reflector, including a support member 22 which is constituted of thick metal, and on which there is bonded a plate glass mirror 23. For effecting the fastening of the reflector on a support frame 24, rubber blocks, or blocks 25 of resilient plastic material, or metallic plate springs are bonded to the rear surface of the support member 22. These blocks serve for the elastic support of fastening elements 26 which consist of a screw 27 rigidly connected with the block and of a pair of nuts 28.

Figure 3:
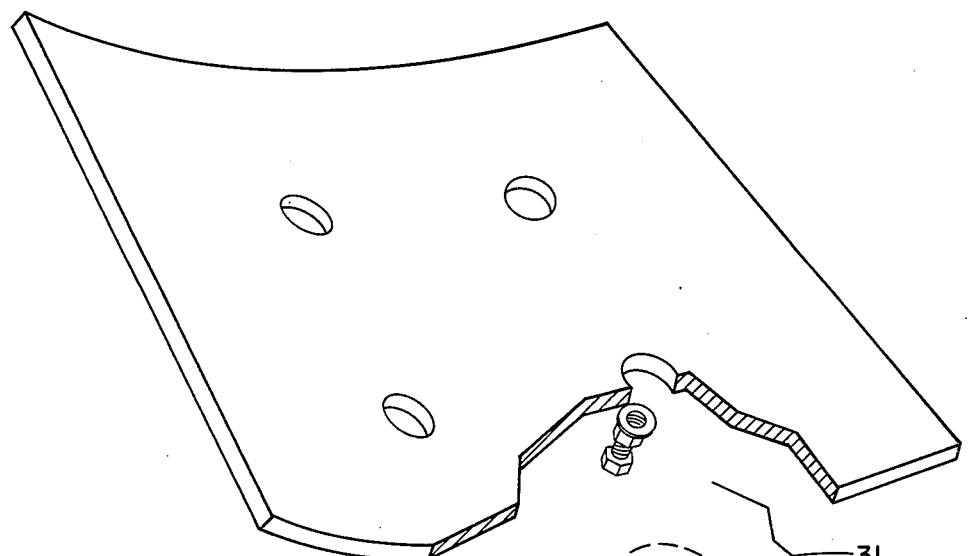
FIG. 3 is a perspective sectional view of a modified support for a reflector.

A modification of the fastening potential is illustrated in FIG. 3. A reinforced support member 30, of a type similar to the support member 13 in FIG. 1, is filled with a casting resin intermediate the cover plate 31 and the base plate 32 at the connecting location. A screw-thread insert or a fastening bolt 33 for the fastening of the reflector to a retainer 34 is cast into this resin. For support there serves a two-part screw arrangement 35 which can be screwed together and of which one part is fastened to support member 30 and the other part to the retainer 34. The screw arrangement 35 serves for the adjustment of the distance or spacing between the support member 30 and the retainer 34 and, additionally, assumes the bearing load of the reflector.

Figure 4:
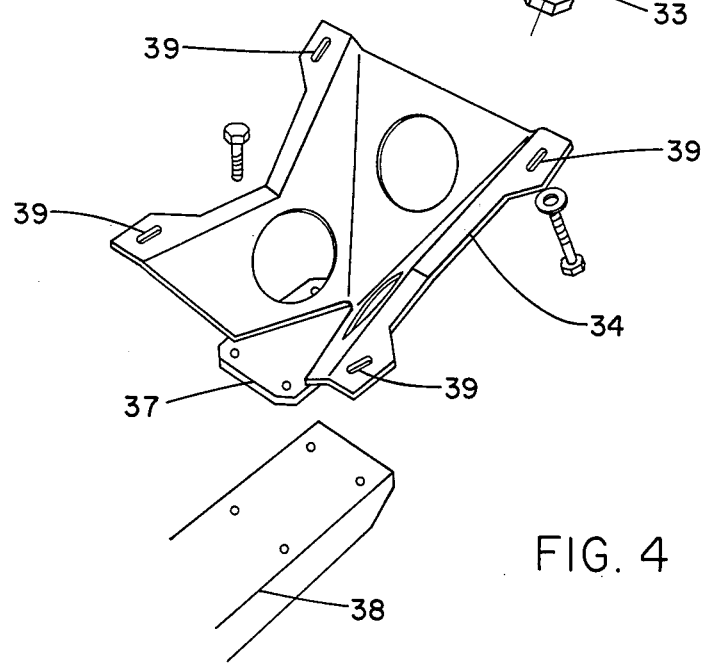
FIG. 4 is a perspective exploded view illustrating the connecting locations of the support with a reflector.

The support 34 can be either directly on the support frame itself or an intermediate element, as is illustrated in FIG. 4 of the drawings. The support or retainer 34 pursuant to FIG. 4 is connected at four points with the reflector, or respectively the support member of a type as previously described or in a similar manner, for which purpose there are provided three or four connecting locations 39. The distance between these fastening points is so designed that any forces which are caused by a wind are reduced to a minimum. A plate 37 which is cemented or welded to the retainer 34 serves for the fastening of the retainer 34 to the support frame 38. In lieu of a separate plate 37 there can also be provided an integrally formed strap or lug. This construction facilitates a flexible suspension of the reflector, so that the reflector will not be imparted any stresses or distortions occasioned by wind-produced movements.

What is claimed is:

1. In a reflector for solar collectors, including a glass plate having one side mirror-coated, the improvement comprising: said glass plate having a thickness less than that required for the glass thickness of a self-supporting glass plate; a support member for said glass plate, said glass plate having the mirror-coated side thereof bonded to said support member, said support member comprising at least one support plate, and rib-like stiffener means being connected with said support plate; and a foil arranged and bonded intermediate said glass plate and said support member.

* * * * *